(12) United States Patent
Li et al.

(10) Patent No.: US 6,745,129 B1
(45) Date of Patent: Jun. 1, 2004

(54) WAVELET-BASED ANALYSIS OF SINGULARITIES IN SEISMIC DATA

(75) Inventors: Chun-Feng Li, Tulsa, OK (US); Christopher L. Liner, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 10/282,751

(22) Filed: Oct. 29, 2002

(51) Int. Cl.$^7$ ................................................. G01V 1/28
(52) U.S. Cl. ........................................................ 702/17
(58) Field of Search ............................... 702/14, 16, 17, 702/18; 367/73

(56) References Cited

U.S. PATENT DOCUMENTS

| | | | |
|---|---|---|---|
| 4,679,174 A | 7/1987 | Gelfand | 367/73 |
| 4,817,062 A | 3/1989 | De Buyl et al. | 367/73 |
| 5,444,619 A | 8/1995 | Hoskins et al. | 364/421 |
| 5,473,759 A | 12/1995 | Slaney et al. | 395/2.75 |
| 5,487,001 A | 1/1996 | Neff | 364/421 |
| 5,529,825 A | 6/1996 | Sutherland | 428/88 |
| 5,563,949 A | 10/1996 | Bahorich et al. | 364/421 |
| 5,586,082 A | 12/1996 | Anderson et al. | 367/73 |
| 5,835,883 A | 11/1998 | Neff et al. | 702/7 |
| 5,850,622 A | 12/1998 | Vassiliou et al. | 702/17 |
| 5,930,730 A | 7/1999 | Marfurt et al. | 702/16 |
| 5,995,446 A | 11/1999 | Meyer et al. | 367/25 |
| 6,052,520 A | 4/2000 | Watts, III | 395/500 |
| 6,052,651 A | 4/2000 | Fournier | 702/14 |
| 6,092,025 A | 7/2000 | Neff | 702/10 |
| 6,246,963 B1 | 6/2001 | Cross et al. | 702/14 |
| 6,278,949 B1 | 8/2001 | Alam | 702/16 |
| 6,292,755 B2 | 9/2001 | Chambers et al. | 702/17 |
| 6,327,537 B1 | 12/2001 | Ikelle | 702/14 |
| 6,330,512 B1 | 12/2001 | Thomas et al. | 702/1 |
| 6,374,185 B1 | 4/2002 | Taner et al. | 702/6 |
| 6,418,381 B1 | 7/2002 | Fuller | 702/18 |

OTHER PUBLICATIONS

Riedi, Rudolf H., "Multifractals and Wavelets: A Potential Tool in Geophysics", 1998 SEG Expanded Abstracts, 4 pages.*

* cited by examiner

*Primary Examiner*—Donald McElheny, Jr.
(74) *Attorney, Agent, or Firm*—Head, Johnson & Kachigian

(57) ABSTRACT

A wavelet-based method for analysis of singularities improves analysis and information gathering from seismic trace data. A wavelet transform is applied to seismic trace data. The Hölder exponent is calculated for every time point of the wavelet transform for each seismic trace. Hölder exponents are then plotted versus time. These graphs are utilized in place of seismic traces themselves in creating two and three dimensional images. The graphs produced using Hölder exponents greatly improve interpretation of stratigraphic boundaries and other geological information to be readily identified. This provides for better, more accurate stratigraphic analysis. In addition, the nature of the Hölder exponents of the seismic trace are consistent with Hölder exponents calculated from acoustic impedance of the various strata.

17 Claims, 15 Drawing Sheets

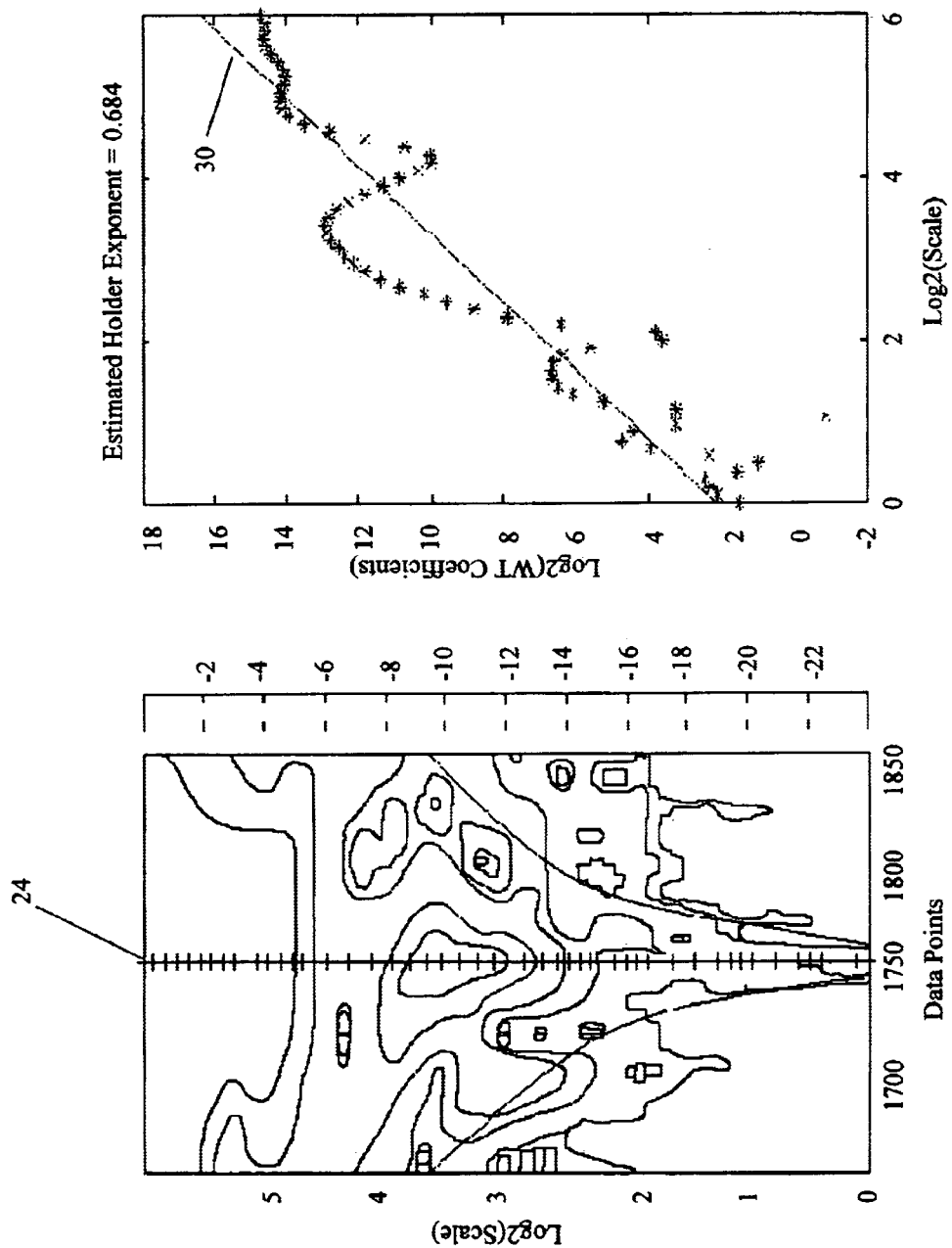

WAVELET-BASED ANALYSIS OF SINGULARITIES IN SEISMIC DATA

BACKGROUND OF THE INVENTION

1. Field of the Invention

The present invention relates specifically to anew seismic attribute for seismic trace analysis.

More specifically, the present invention relates to application of a wavelet transform to seismic traces and subsequent calculation of pointewise Hölder exponents at local time points. The resulting data can be used to produce greatly improved seismic imaging of stratigraphic features in 2D, 3D or time lapse data. The Hölder exponents correlate closely with results from acoustic impedance and therefore allow data gathering to provide new geophysical information. In addition, Hölder exponents calculated from singularities in the traces very sharply and distinctly delineate borders between strata.

2. Prior Art

In the petroleum industry, drilling risk is best reduced by accurate, reliable imaging of geological subsurface formations. Stratigraphic and geophysical data is vital to finding petroleum reservoirs. A rapidly expanding area of oil exploration is in the image analysis of seismic trace data.

In order to obtain a view of the subsurface geology, explorationists generate seismic waves and use sensors to detect reflections of these waves. Interfaces in the subsurface strata reflect these waves. By measuring the returned amplitude and the time between initiation of the wave and its reflection to the surface, subsurface features may be detected. Measurements made by the sensors are known as seismic traces.

A variety of methods have been developed to reduce noise and increase resolution. Traces resulting from identical points in the subsurface may be stacked (summed) and migrated. This both reduces noise and increases resolution. However, coherent noise tends to be amplified by trace stacking. Fourier transforms may also be applied to seismic traces in an effort to identify and eliminate coherent noise. There have been many attempts to improve interpretation of seismic trace data, none of which contemplate the methodology of the present invention.

The patent (U.S. Pat. No. 5,563,949) to Bahorich et al. (1996) and the patent (U.S. Pat. No. 6,092,025) to Neff (2000) fall into the category of a new seismic attribute from seismic data. The attribute from U.S. Pat. No. 5,563,949, coherency cube, is from similarity or correlation analysis of adjacent seismic traces and gives better standout of geological structures such as faults or edges of salt domes. However, the nature of their algorithm makes their attribute useful primarily only on horizontal or time slices and all relevant stratigraphic information on vertical sections are smeared out. There is no application of a wavelet transform.

U.S. Pat. No. 6,092,025 calculates a type of seismic attribute called Delta Amplitude Dip (DAD), also based on similarity or cross-correlation analysis of adjacent seismic traces, and claims that displaying DAD values in a time or horizontal slice provides a direct indicator of hydrocarbon. Cross-correlation analysis is good for edge detection, and thus both coherency cube and DAD are suitable for detecting faults or edges in seismic data. At the same time they also share the same kind of drawbacks (DAD attribute is also only suitable for time or horizontal slice). In contrast, the algorithm of the present invention, based on the wavelet transform, is highly localized and gives clearer images of subsurface singularity variations, and therefore is able to deliver stratigraphic and structural information from both vertical and horizontal sections.

One important feature of the present invention is the application of wavelet transform and the calculation of Hölder exponent/singularity analysis on seismic data. None of these operations or analyses was performed in reported patents. However, the algorithm named very short-time Fourier transform (VSTFT), in the invention (U.S. Pat. No. 5,850,622) of Vassiliou et al., (1998) is similar to ours. Vassiliou et al. claimed that by using VSTFT, shorter in length than was felt to be possible, they discovered a novel method of reorganizing the data in frequency domain so that noise can be better removed or attenuated, and attribute analysis and trance editing becomes easier. Their method gives no clue as to how singularity analysis can be performed.

As we all know, wavelet transform is an outgrowth of Fourier transform or short-time Fourier transform, but what makes the wavelet transform more powerful is that it is localized in both frequency and time domain. The Short-time Fourier transform tries to gain some time resolution with a short, fixed-length time window. Unlike the wavelet transform which uses variable-length windows, a fixed window will make the time resolution everywhere the same. According to the Reciprocal Uncertainty Principle, a very short time window, as implemented by Vassiliou et al., gives better time resolution but poor frequency resolution, which makes localized frequency analysis very impractical.

Several inventions (U.S. Pat. No. 4,679,174 to Gelfand; U.S. Pat. No. 4,817,062 to De Buyl et al.; U.S. Pat. No. 5,487,001 and U.S. Pat. No. 6,092,025 to Neff) are focused on combining geologic information, such as well logs, with seismic data for extracting subsurface lithologic information. These generally involve modeling and inversion. These inventions are unlike the present invention in terms of research goal and methodology. U.S. Pat. No. 4,679,174 (Gelfand) basically explores the power of forward modeling and iteratively compares seismic synthetics with real seismic data until an acceptable match has been achieved. Gelfand attempts to use modeling to recover high-frequency components in the seismic spectrum that are lost during seismic exploration. The present invention does not try to recover high-frequency components (fine scale stratigraphic information) lost in the seismic trace. Rather, it focuses on delineating locations and singularity strengths of stratigraphic boundaries. The present invention creates an image showing a new attribute in which stratigraphic information is more prominent than in seismic amplitude images (where the nature of seismic reflectivity can obscure true acoustic impedance variations). Even though seismic data are band-limited, the amplitude spectrum for a typical seismic trace still reveals a frequency band of ~10 to 100 Hz, which is broad enough for a successful multiscale analysis based on continuous wavelet transform. Since no inverse wavelet transform is necessary for singularity analysis, the invention disclosed herein simply analyzes the scaling information within the seismic frequency band.

U.S. Pat. No. 4,817,062 (De Buyl et al., 1989) applies similar data sets and concepts as U.S. Pat. No. 4,679,174 (Gelfand). In U.S. Pat. No. 4,817,062 a method for estimating subsurface porosity is established based on integration of well and seismic data. First, a seismic acoustic model is obtained from seismic survey. Then porosity information is assessed based on a porosity-acoustic impedance relationship they derived in the invention. Both the goal and the methodology of De Buyl et al. are quite different from ours.

Two patents to Neff (U.S. Pat. No. 5,487,001 and U.S. Pat. No. 6,092,025) disclose estimating subsurface petrophysical properties from the integration of seismic and well data. They are very similar in concept, both applying forward modeling, synthetic generation, iterative comparison between synthetics and real seismic traces. U.S. Pat. No. 5,487,001 (1996) is designed to determine petrophysical properties associated with a subterranean layer, while patent U.S. Pat. No. 6,092,025 (1998) is more tuned for estimating vertical permeability and porosity variations within a reservoir. Neither utilizes the wavelet transform and thus distinct from the present invention.

The patent (U.S. Pat. No. 6,246,963 B1) to Cross et al. (2001) involves no seismic data but quantitative stratigraphic modeling to predict stratigraphic and sedimentologic attributes at locations other than those at which data are collected. Clearly this invention falls into the category of mathematical modeling in geology and geostatistics, and does not bear any similarity to the present invention.

Alam's invention (U.S. Pat. No. 6,278,949) is a method for multiple attribute identification of structure and stratigraphy in a volume of seismic data. First, multiple attributes are generated from seismic data, and then subsets of multiple attributes are interactively selected, thresholded and combined with one of a suite of mathematical operators into a scalar function. By manipulating the attribute volume, a user visually recognizes bodies of potential hydrocarbon reservoirs on a color graphic workstation. This invention focuses on the manipulation of different attributes but gives no indication how to generate these attributes. Alam's invention does not disclose computation of the Hölder exponent or its use in subsurface imaging. The computation of the Hölder exponent from seismic data is an important component of the present invention.

Seismic processing can be subdivided into two categories, data processing and image processing, based on the type of data input to the processing and on the purpose of the processing. Data processing includes all the processing steps that are aimed at obtaining a final subsurface image based on seismic amplitudes. These steps include deconvolution, NMOIDMO, migration, etc. Image processing is aimed at extracting further geological information from the migrated seismic data. A key distinction is that data processing algorithms typically exploit aspects of seismic wave propagation, whereas image processing tends to be more geared, and would be equally applicable, to non-seismic data problems. For example, coherency and instantaneous attributes would fall in the image processing category. Image processing products are commonly termed "attributes" in seismic work. With an ever-increasing need to extract geological information from seismic data, image processing becomes more and more important.

Seismic amplitude plays the predominant role in seismic interpretation and is the raw material for image processing. While it is critically important, it can also disguise true geological features from the unaided eye. It would be very informative to have a type of attribute that is independent of seismic amplitudes but also geologically sharp and meaningful on a cross section. Among some of the most frequently applied seismic attributes, AVO (amplitude versus offset) is based on prestack data and is limited to certain targets, coherency is good generally for time slice interpretations but destroys information on vertical sections, and instantaneous phase or instantaneous frequency are unable to localize in time to indicate sharp stratigraphic boundaries. Thus there is an ongoing need for additional ways to extract stratigraphic information directly from seismic amplitude volumes.

It is therefor desirable to provide improved seismic visibility of stratigraphic features and additional geologic information from existing seismic trace data It is also desirable to provide a method of interpreting seismic trace data that does not depend upon seismic amplitude.

SUMMARY OF THE INVENTION

In the present invention the Hölder exponent ($\alpha$) is introduced as a new seismic attribute capable of capturing irregularities in seismic data $\alpha$ measures the regularity of seismic trace data by measuring the growth or decay of wavelet coefficients across a range of scales for each time point in the data. Herein the term scale is taken to be synonymous with frequency. Those skilled in the art will appreciate that there are other, similar methods of measuring the regularity of the data, such as the VSTFT and the Hurst exponent. However, $\alpha$ provides the most accurate and reliable attribute for elucidating stratigraphic information in geophysical data.

Seismic interpretation has been traditionally based on seismic reflectivity strengths measured by amplitude. However, studying amplitude alone can disguise the true nature of subsurface geology and produce blurred stratigraphic boundaries. Very often important information is found in singularities that are not necessarily associated with a certain amplitude pattern. $\alpha$ is a measure of singularity strength defined at or around a point. The more regular the data, the larger the value of $\alpha$.

The Hölder exponent is computed using wavelet-based multiscale analysis, which is the preferred tool in detecting both the location of the singularity strengths and sharp changes in the signal. $\alpha$ improves our ability to delineate stratigraphic layer boundaries that are vague in the original amplitude based seismic images. The natural attribute $\alpha$ provides a major breakthrough in how seismic data are interpreted.

This new attribute $\alpha$ is derived from seismic trace data to provide a new image processing product. It provides for cleaner images of stratigraphic boundaries and features. There is nothing in the prior art that would suggest that application of a wavelet transform and subsequent measurement of growth/decay along a range of scales would have any beneficial results, much less the improved detection of stratigraphic boundaries and additional geophysical information provided by the present invention.

According to the present invention, seismic trace data, expressed as amplitude versus time, is subjected to a wavelet transform which converts the data into a two dimensional graph in which the wavelet coefficient parameter is a function of time and scale. Wavelet transforms have the advantage of high resolution in both time and scale. In comparison, VSTFT is highly resolved in either time or frequency, but not both. In wavelet transform literature this is referred to as the Heisenberg uncertainty principle. This makes VSTFT and other transforms that are subject to the Heisenberg uncertainty principal undesirable in the present invention. This resolution trade off prevents them from producing the high resolution, informative results of the present invention.

Once the seismic trace has been transformed, further studies can be made at individual time points. This results in a series of two dimensional graphs of wavelet coefficient versus scale for each localized time point. When these two parameters are expressed on a log-log plot, they exhibit a linear relationship. Any of a number of linear regression methods may be utilized in order to determine the wavelet coefficient/scale slope of this line. A least-squares linear regression is a well-known, preferred method of determining such a slope. This slope is known as a Hölder Exponent ($\alpha$). Of course, the Hölder exponent may be derived from non-log plots, but the calculations are significantly more cumbersome.

Hölder exponents are calculated for each localized time point of a seismic trace. This provides the Hölder exponent as a function of time, referred to herein as a Hölder trace. These Hölder traces are displayed in place of seismic traces to create a Hölder image, volume or time-lapse volume. The resulting Höder image has the property that geophysical and stratigraphic characteristics that are not readily apparent in typical reflectivity image graphs are easily observed in a Hölder trace image. Geologic features that are blurred and/or very difficult or impossible to identify in standard seismic trace reflectivity imaging graphs become apparent in the maps produced by Hölder exponents.

The Hölder exponent is a measure of asymptotic behavior of the wavelet coefficient versus scale. Nothing in the prior art suggests that the asymptotic behavior of wavelet coefficients across a range of scales would elucidate any seismologic, stratigraphic, geophysical or lithologic information from a seismic trace. In fact, the prior art, such as the patent to Vassiliou, actually teach away from measuring wavelet coefficient behavior across a scale or range and state that the frequency range is too narrow for such an analysis. One of the unexpected features of the present invention is the discovery of a method for accurately analyzing singularities at a localized point in time by choosing an appropriate range of scales in order to minimize the standard deviation of a linear regression. Another novel, unforeseen aspect of the present invention is that by analyzing asymptotic behavior of singularities using a wavelet-based method will both optimize the resolution of seismic imaging and provide additional geophysical data. Another surprising result of this method of singularity analysis is that it correlates well with results from acoustic impedance data. This provides even more geophysical and lithologic information.

BRIEF DESCRIPTION OF THE DRAWINGS

FIG. 2A shows an enlarged view of the wavelet transform of FIG. 1 around point 24;

FIG. 2B shows a log-log plot of wavelet coefficient versus scale for a time point having a small value Hölder exponent;

DETAILED DESCRIPTION OF THE PREFERRED EMBODIMENTS

Figure 1:
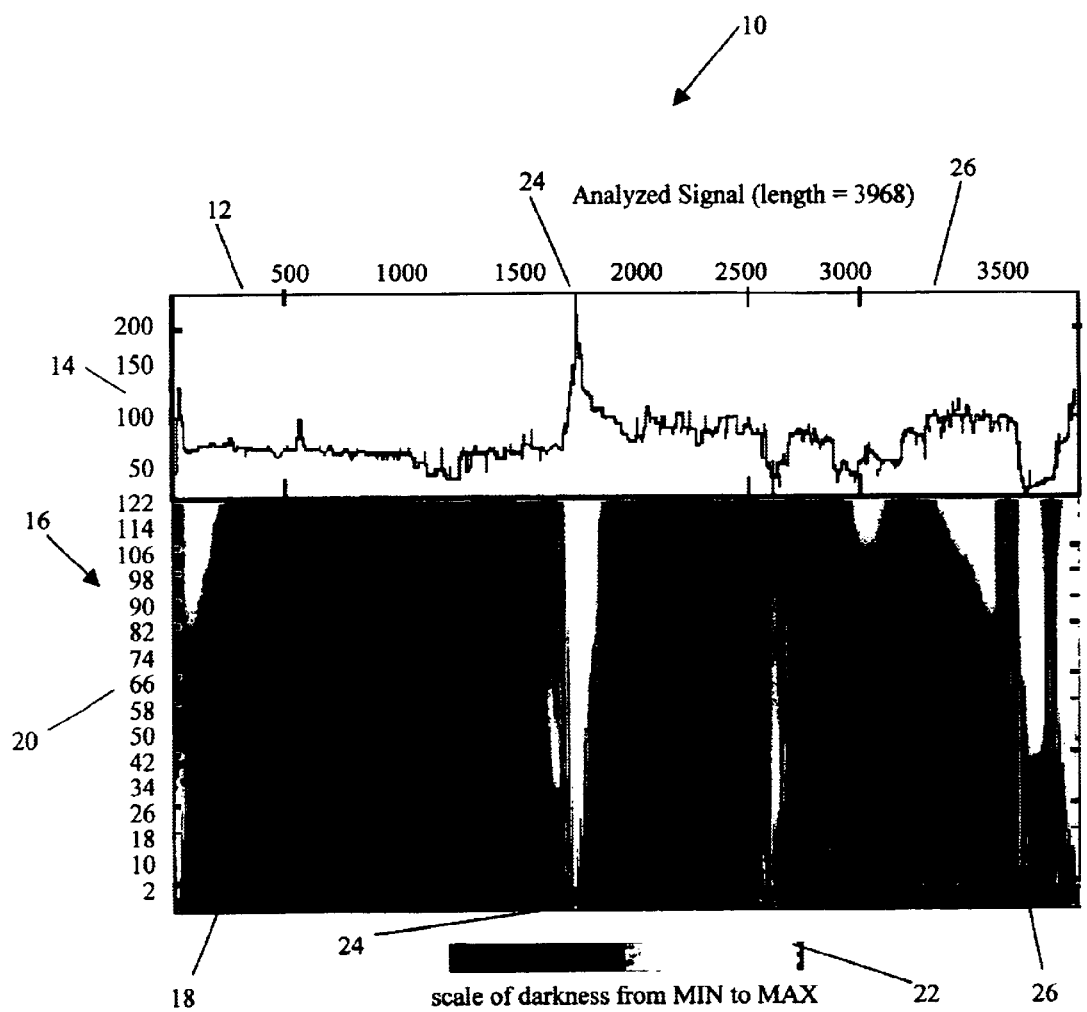
FIG. 1 shows an example of a wavelet transform applied to gamma ray well log data.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

In the present invention, singularities in seismic trace data are analyzed by applying a wavelet transform and a subsequent calculation of Hölder exponents in order to improve imaging and the information obtained from the seismic traces.

A great deal of work has been done in the field of petroleum exploration resulting in data processing techniques that reduce the amount of noise found in seismic traces. This has resulted in improved resolution. However, resolution is still relatively poor. Only highly skilled explorationists are capable of interpreting reflectivity imaging data. Unfortunately, even highly skilled explorationists have great difficulty identifying stratigraphically important regions of the subsurface using seismic trace data. Often, important geologic features are too blurred and poorly resolved to be identified. Stratigraphic and geologic features that are difficult or impossible to identify using current techniques, are readily visible when the present invention is used. The techniques disclosed herein differ dramatically from the noise reduction techniques of the prior art. Rather than attempting to reduce the noise of the seismic trace itself, a new attribute is calculated from the seismic trace data in order to facilitate geological interpretation of seismic data. This attribute is used in place of the seismic trace in preparing seismic images. Instead of using the trace itself, values calculated from transformed traces are graphed relative to time. Nothing in the prior art suggests that such a method would be beneficial. Indeed, while it appears related to the physics of seismic wave propagation, it is still unclear precisely why the method of the present invention results in such improved imaging and interpretation.

Wavelet transforms are similar to Fourier transforms (FT) in that both seek a better representation of the original data in a transformed domain. FT works well for periodic and stationary signals where time information is not important. For non-stationary signals FT is inappropriate because it can not express how a signal varies with the time. To study both time and frequency information, windowed Fourier transform (WFT, also VSTFT) chops the signal into segments and then applies FT for each segment. The size of each segment, the window, remains constant.

WFT has a problem rooted in the Heisenberg uncertainty principle. This principle states that one cannot know exactly the time-frequency representation of a signal. In other words, one cannot know the exact frequency component at an instant time. A smaller window gives better time resolution, but poor frequency resolution; a larger window is not localized in time, but has better frequency resolution. The wavelet transform (WT) overcomes these deficiencies by using windows that vary with wavelet scale, which is analogous to frequency.

WT analyzes data with respect to scales, instead of frequencies. Here the widths of window are changed by stretching or squeezing a constant number of oscillations (wavelet). This is fundamentally different from the practice in WFT, which uses a window of constant size and fills it with oscillations of different frequencies.

Like FT, there are also continuous WT (CWT), discrete WT (DWT) and fast WT (FWT). CWT calculates wavelet coefficients at every possible scale. It is time consuming and generates huge amounts of data. Using scales and positions based on powers of two, so-called dyadic scales and positions, makes the analysis more efficient and just as accurate. This is how the discrete wavelet transform (DWT) works.

There are many different wavelet families. Different families make trade-offs between how compactly they are localized in space and how smooth they are. Some examples are the Ricker wavelet, the Morlet wavelet, the Harr wavelet and the Daubechies wavelet. Those skilled in the art will appreciate that each wavelet has parameters that may be altered to stretch or compress the wavelet as desired. Those skilled in the art will also appreciate that these are only a few of existing wavelets that are suitable for use in the present invention. It will also be obvious to the skilled artisan that new wavelets suitable for use in the present invention are constantly being created and that developing new wavelets is possible. Any wavelet may be used in the present invention. However, different wavelets will produce better results, depending on the nature of the seismic trace data.

For locally self-similar processes it is natural to consider local Hurst exponent (Hu) or local fractal dimension as a measure of singularity locally. Hu is a global indicator of the complexity of a signal. The calculation of Hu using rescaled range technique (RIS) requires a minimum number of registered points for accurate Hu estimation. This minimum length requirement makes it difficult to have a localized Hu estimation with a certain degree of accuracy. Another definition for the Hurst exponent developed to overcome these difficulties is the so-called variance of increment method. While this method is more accurate than R/S, it is not accurate when the global scaling exponent is above 0.75. This method also requires a large number of data points, and prevents a detailed local analysis of data complexities.

Hölder exponent ($\alpha$) is capable of detecting detailed singularity strengths. While different in definition, $\alpha$ is closely related to Hurst exponent (Hu). Both are measures on the degree of singularity in the data. $\alpha$ allows analysis of singularity behavior in the data at every time point for practical applications. Not only does this allow analysis of information on major isolated boundaries, but geological information within important boundaries may be extracted as well. This makes detailed 3D and 4D interpretation plausible.

One algorithm for estimating the Hölder exponent is briefly outlined as the following:
1. Perform continuous wavelet transform (CWT) with an appropriate family of wavelet.
Different wavelets will give slightly different Hölder exponents but all major boundaries should be captured. We apply in this study the complex Morlet wavelet, which is defined as $$\psi(x) = \sqrt{\pi f_b}\, e^{2i\pi f_c x} e^{-x^2/f_b},$$

where $f_b$ is the bandwidth parameter and $f_c$ is wavelet center frequency. A Morlet wavelet is a complex sine/cosine function, $e^{2i\pi f_c x}$, modulated by a classical Gaussian bell function, $e^{-x^2/f_b}$.

The complex Morlet wavelet is not compactly supported but, rather, is adequate for detecting periodic variations. It also warrants an exact reconstruction of the original signal.

2. Study the behavior of the CWT coefficients and choose appropriate range of scales for least-square linear regression on CWT coefficients. This step is important. Very small scales should be left out to remove noise effects. Coefficients from higher scales could be from interfering singularities that are closely spaced, and thus reduce the resolution if included in calculations.

3. Find the maximum slope of the straight lines in the log-log space of scales and respective CWT coefficients. Calculate Hölder exponent ($\alpha$) based on the following linear relationship:

$$\log|W\{f\}(\sigma,x)| \leq \log C + \alpha \log \sigma,$$

where $W\{f\}(\sigma,x)$ is the wavelet transform coefficients with respect to scale $\sigma$ and location $x$, $C$ is constant, and $\alpha$ is the Hölder exponent.

This Hölder exponent is associated with a time point on the seismic trace, and all such Hölder exponents for a given trace are output as a Hölder trace.

Figure 1A:
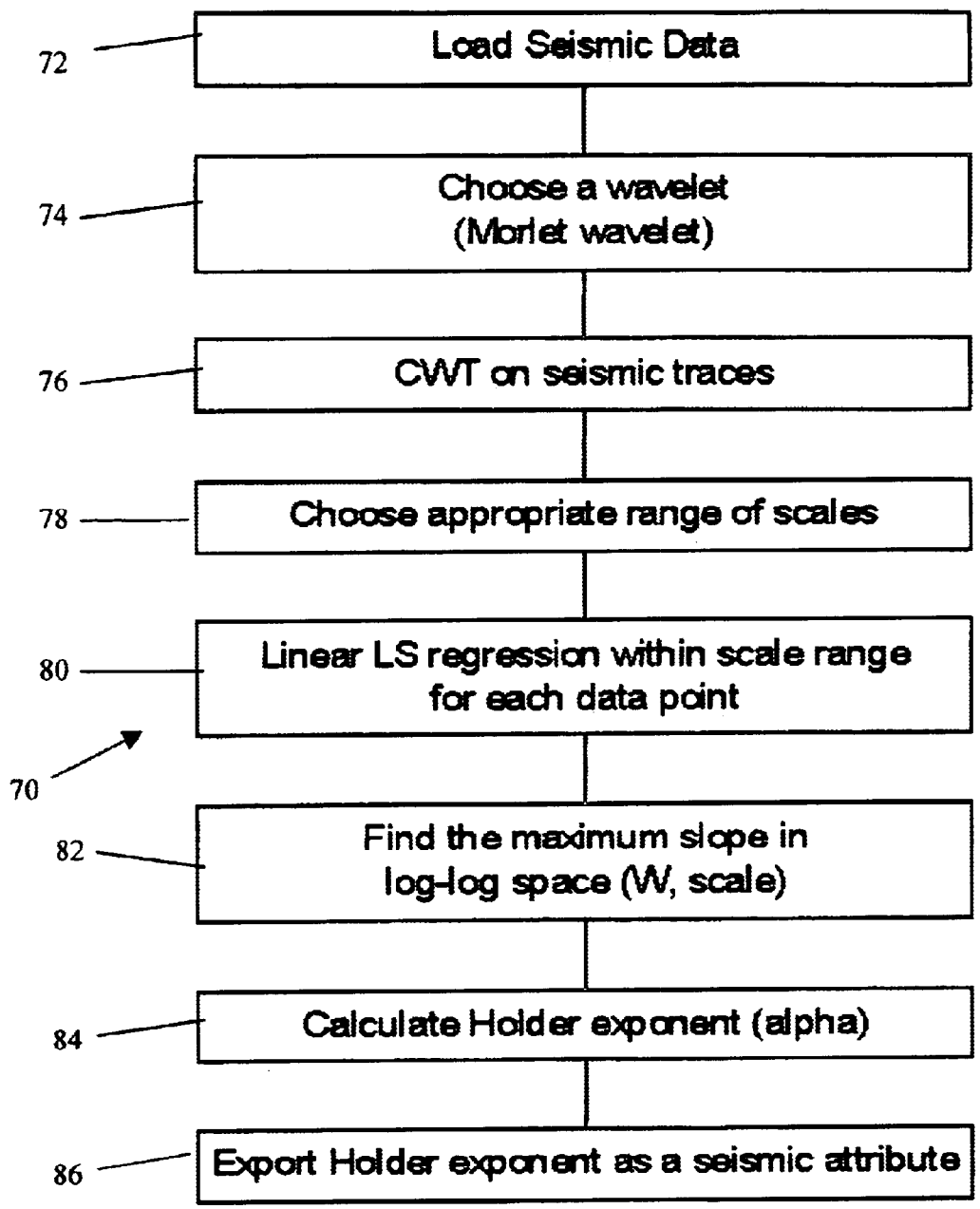
FIG. 1A shows a flowchart of the algorithm of the present invention.

FIG. 1A is a flowchart illustrating the above algorithm. Flowchart 70 expands the above algorithm into eight steps. The first step 72 is to load the seismic data into a computer program capable of calculating the Hölder exponents. The second step 74 involves choosing an appropriate wavelet. As stated above, the Morlet wavelet is a good candidate for this type of analysis. However, over wavelets may also be used. Once the wavelet is chosen, a continuous wavelet transform is performed on the seismic trace data. This is shown as the third step 76.

Once the wavelet transform has been performed the fourth step 78 begins. It is important to find the range of scales that will produce a relatively small standard deviation when a linear regression is performed upon it. Once the scales have been chosen the linear regression is performed across the range during the fifth step 80. Next, the maximum slope in log-log space for the range of scales is determined during the sixth step 82. In the seventh step 84, the Hölder exponent is calculated using the slope determined in step 6 82. Finally, in the eighth step 86, the Holder exponent is exported as a seismic attribute so that it can be used to graph stratigraphic information.

Those skilled in art will appreciate that this is only one of many algorithms suitable for the present invention.

In the past, it has generally been thought that the relatively narrow band width of seismic trace data prevented accurate singularity analysis by measuring asymptotic behavior of wavelet coefficients over a range of scales. One of the important aspects of the present invention is the unexpected, reliable results of a method to overcome this problem. Instead of calculating a Hölder exponent over the entire range of scales, a smaller range of scales is chosen over which to calculate the Hölder exponent. Therefore, very small and very large scales are eliminated. This resulting mid-range of scales is further adjusted in order to minimize the standard deviation of a linear regression line. The present invention results, in part, from the discovery that choosing a range of scales having wavelet coefficient data points that will fit well in a linear regression model results in an accurate determination of the Hölder exponent, and therefore singularity strength.

Once Hölder exponents have been determined for each time point, they may be graphed as Hölder exponent versus time. This is the Hölder trace. Standard image display techniques typically used on seismic traces are then applied to these Hölder traces. The result is a Hölder trace section or volume in which stratigraphic boundaries and geophysical properties are clearly shown.

FIG. 1 shows an illustration of application of a wavelet transform on a typical set of gamma ray well log data. Gamma trace 10 is here expressed as a graph in two parameters. Horizontal axis. 12 represents depth, while vertical axis 14 represents amplitude. Upon application of a wavelet transform, gamma trace graph 10 is converted into wavelet transform graph 16. Wavelet transform graph contains three parameters depicted as a horizontal axis, a vertical axis and color intensity. Horizontal axis 18 represents the time parameter corresponding to horizontal axis 12. Vertical axis 20 represents a scale of the wavelets. Intensity according to bar 22 is representative of the wavelet coefficient. FIG. 1 illustrates how the wavelet transform converts amplitude at each point in depth into a combination of wavelets across a range of scales having different "strengths" expressed in terms of the wavelet coefficient.

In the present invention, the Hölder exponent is calculated for each point in time or depth along the scale axis.

FIG. 2A shows an enlarged view of the wavelet transform 16 in FIG. 1 around point 24. FIG. 2B is a diagram comparing the scale versus wavelet coefficients at point 24 in FIGS. 1 and 2A. The scale and wavelet coefficient are compared on a log-log plot. As can be seen, the wavelet coefficient changes little across the range of scales. When a linear regression is performed from the data points, it results in a line 30 having a slope that gives the Hölder exponent. A relatively small or negative slope like the one shown in FIG. 2 is indicative of a high degree of local singularity.

Figures 3A, 3B:
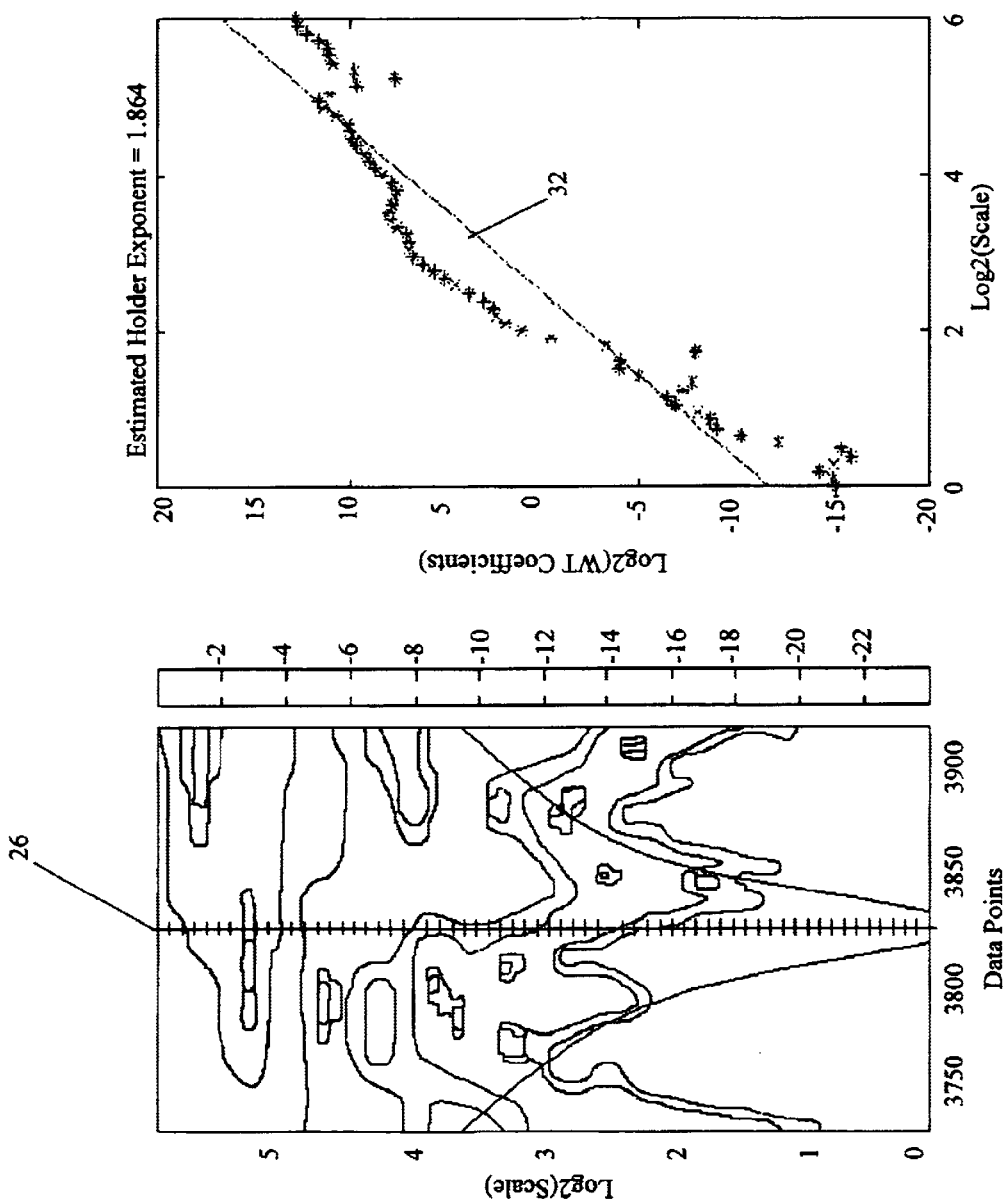
FIG. 3A shows an enlarged view of the wavelet transform of FIG. 1 around point 26.
FIG. 3B shows a log-log plot of wavelet coefficient versus scale for a time point having a high value Hölder exponent.

FIG. 3A shows and enlarged view of the wavelet transform 16 in FIG. 1 around point 26. FIG. 3B shows the scale and wavelet coefficient log-log plot of scale vs. wavelet coefficient for time point 26. Here, a linear regression results in line 32 having a much greater slope. This is indicative of a lesser degree of singularity.

Figure 4:
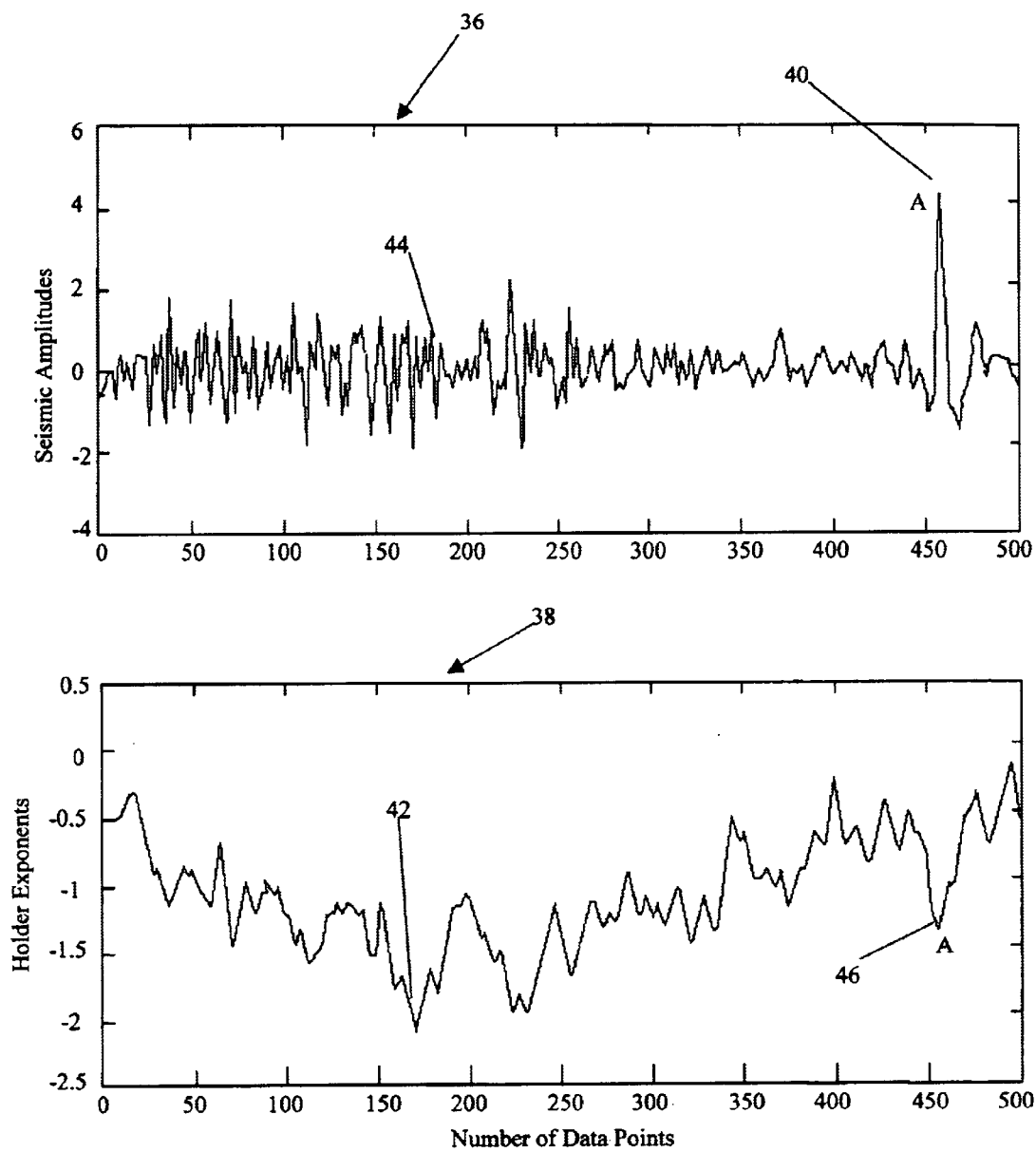
FIG. 4 shows a seismic trace and corresponding Hölder trace.

Hölder exponents are calculated for each time point along the seismic trace. The result is a graph of time versus Hölder exponent. FIG. 4 shows a seismic trace 36 and its corresponding Hölder trace 38. As can be seen in FIG. 4, the two graphs are very different. It is interesting to note that peak 40 of the seismic trace corresponds to dip 46, indicating a strong degree of singularity at that point. It is more interesting to note that the greatest dip 42 in the Hölder trace corresponds to point 44 in the seismic trace. There is nothing in the seismic trace to indicate that point 44 has a degree of singularity approaching, much less greater than point 40. This is illustrative of how the present invention elucidates information that is for all practical purposes undetectable in the seismic trace itself. It is this unexpected result that allows the amount of information gleaned from a seismic trace to be substantially increased when the present invention is applied.

Hölder trace imaging is accomplished by essentially using the present method to estimate the Hölder value at every point on every trace in a seismic data set. The result is a Hölder image or volume. As will be explained in Examples 1 and 2 below, these Hölder seismic images produce additional stratigraphic and geophysical information that is not apparent in seismic trace amplitude images.

Figure 5:
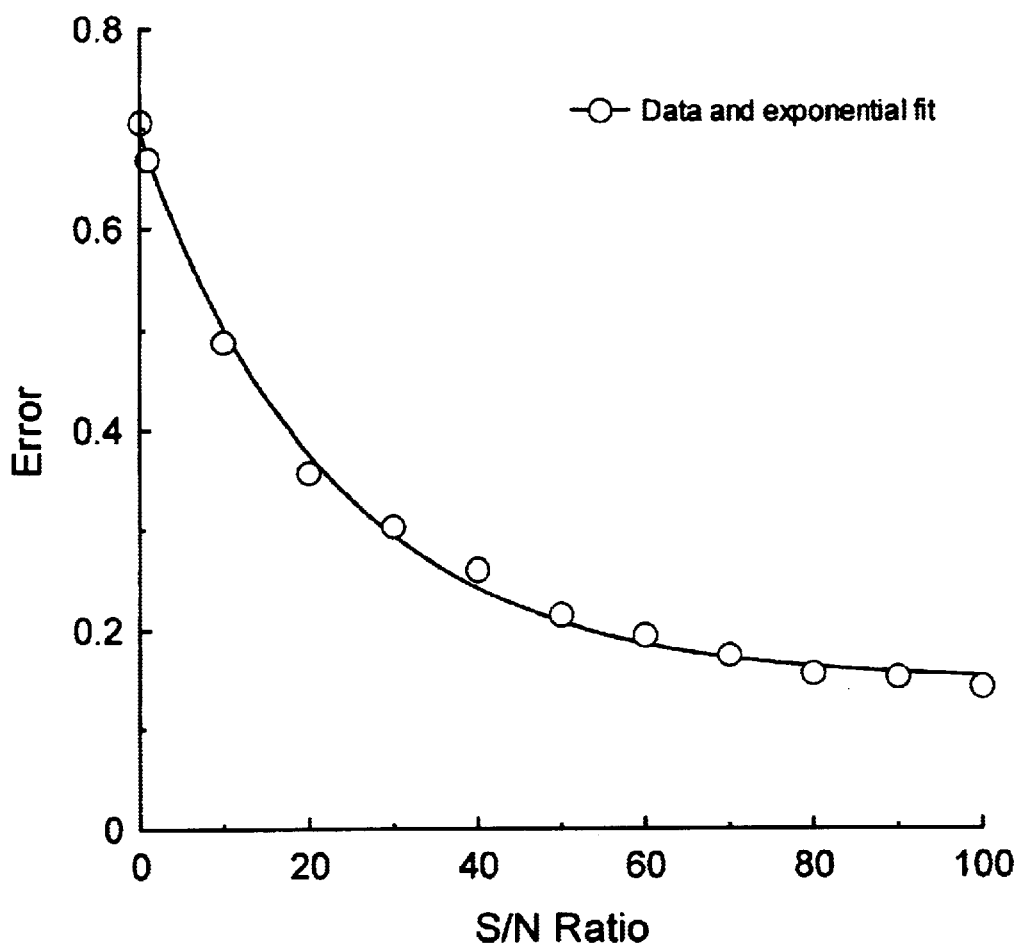
FIG. 5 shows a graph of predicted error behavior for Hölder exponents dependent upon the signal-to-noise ratio.

Seismic data is always accompanied by noise. As discussed above, there are numerous data processing techniques designed to reduce both white and coherent noise. If we assume that noise in the data is Gaussian, then the error in the estimated Hölder value is exponentially inversely proportional to the signal to noise ratio (S/N ratio). That is, as the S/N ratio decreases, the error of the Hölder trace increases exponentially. This relationship is illustrated in FIG. 5.

Figure 6:
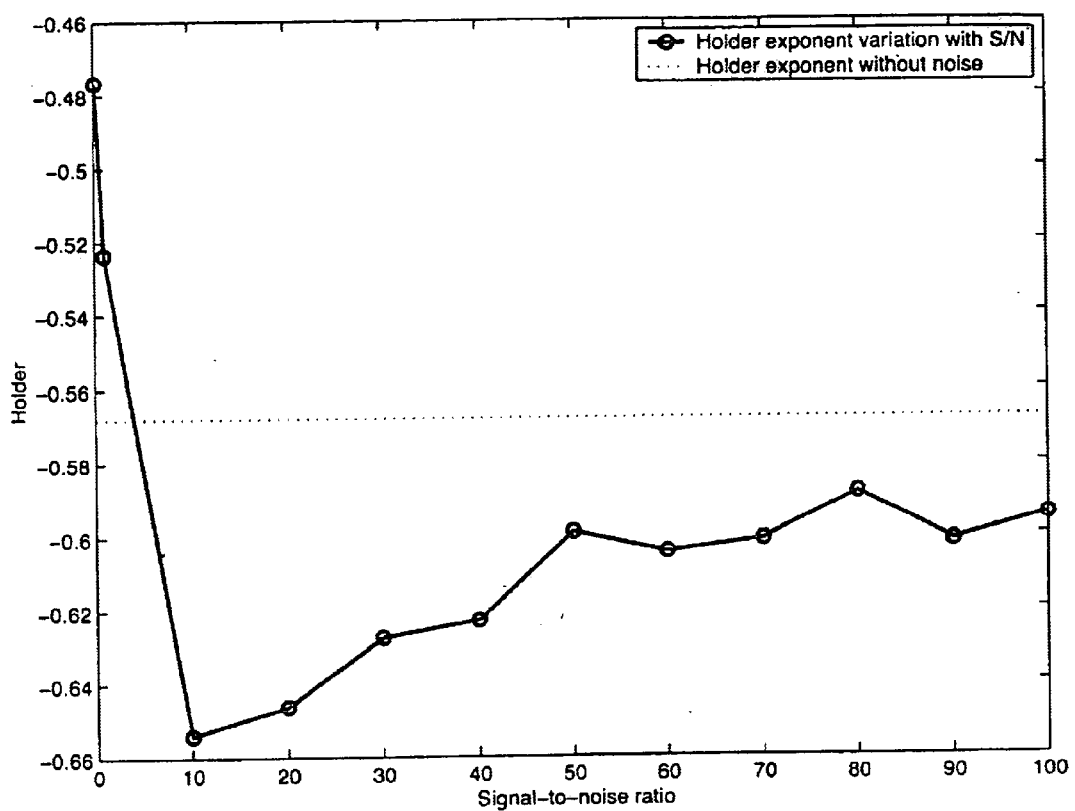
FIG. 6 shows variation of the Hölder exponent based on the signal-to-noise ratio.

To test this, artificial noise was added to synthetic data in varying ratios to the signal. Hölder exponents were then calculated and error was determined relative to a noise-free case. FIG. 6 shows the results of this test. Error within a Hölder trace is in fact exponentially inversely proportional to the S/N ratio. As can be seen from FIG. 6, so long as the SIN ratio is 10 or greater, the Hölder trace is acceptably consistent. Thus, even when the seismic trace comprises as much as 10% noise, the Hölder trace can be successfully computed.

Those skilled in the art will appreciate that the Hölder exponent may also be calculated using non-linear regression on linear-linear or log-linear plots of wavelet coefficients vs. scale. Those skilled in the art will also appreciate that the asymptotic behavior of wavelet coefficients across a range of scales may be measured by values that correspond directly to Hölder exponents and are merely alternative methods of characterizing the asymptotic behavior in the same method as disclosed herein

EXAMPLE 1

We perform our algorithm on a 2D seismic line from the Mergui Basin, Andaman Sea, offshore Thailand. This seismic section is chosen because it has good signal-to-noise ratio, contains well-defined geological features such as growth faults, unconformities, sedimentary wedges and basement reflections.

Figure 7:
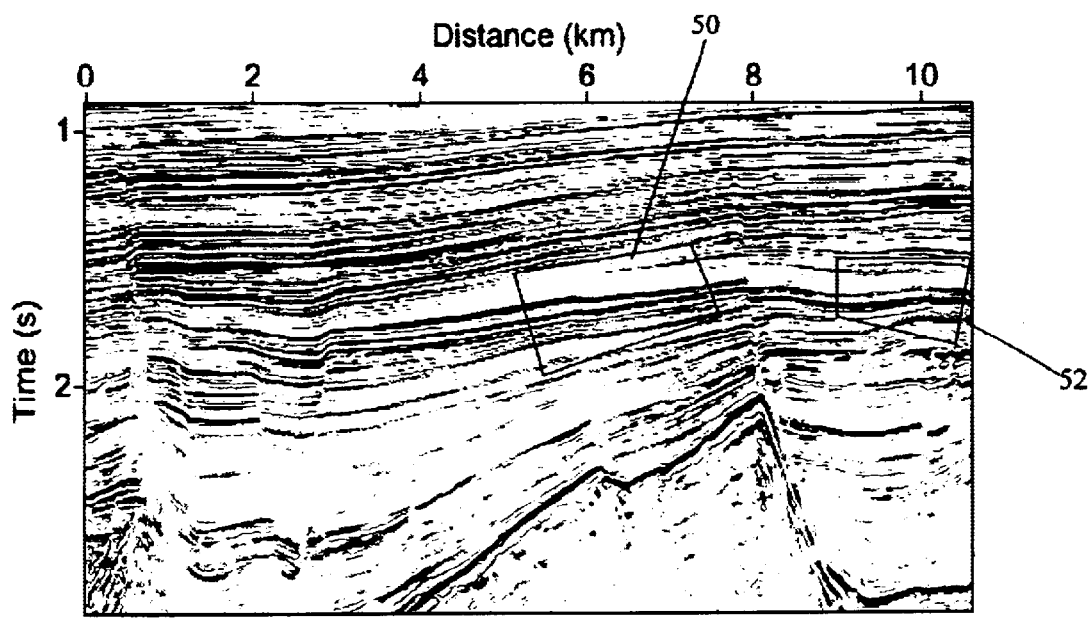
FIG. 7 shows a seismic line section image produced by seismic traces.
Figure 8:
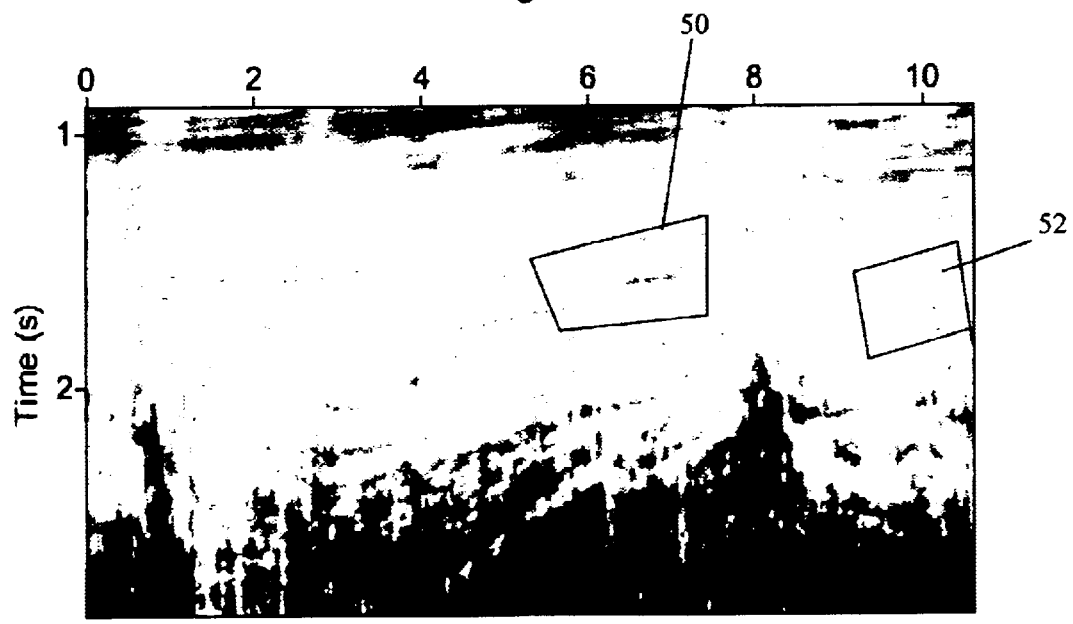
FIG. 8 shows a Hölder traces trace image computed from the seismic trace data shown in FIG. 7.

FIG. 7 shows a 2D stacked, migrated seismic section for a portion of the Mergui Basin. FIG. 7 is a typical seismic image produced by seismic traces and standard seismic processing. FIG. 8 shows a corresponding image produced by displaying corresponding Hölder traces. Those skilled in the art will immediately appreciate that the Hölder trace seismic image presents a section much clearer and easier to interpret. For example, seismic features 50 and 52 appear to have very similar characteristics in the seismic section in FIG. 7. The Hölder trace section of FIG. 8, however, reveals that they have distinct characteristics. Moreover, stratigraphic structures, such as wedges, down-cutting relationships and pinched-outs, have increased clarity on the Hölder section. Major stratigraphic packages are indicated by fairly uniform Hölder exponents within the package and by sharp contrast with neighboring packages.

Figure 9:
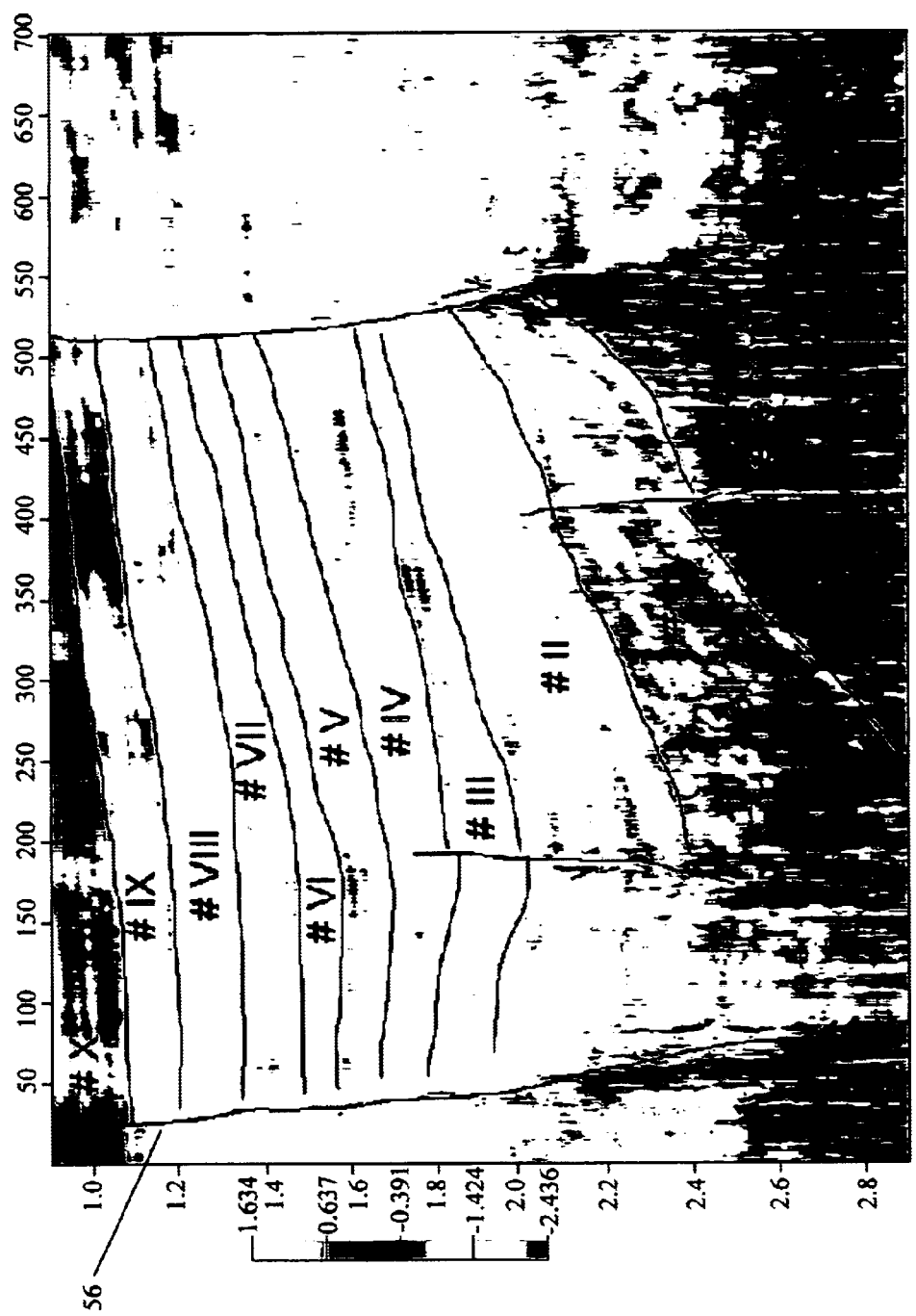
FIG. 9 shows another Hölder trace image.

FIG. 9 shows the same section having an image produced using the Hölder trace image processing with a color bar different from the one used in FIG. 8. Ten different sedimentary packages are readily revealed and have been outlined in FIG. 9. Lateral variations and singularity strengths within a layer are indicative of stratigraphic, petrophysical or fluid composition changes within the layer. Package VII is more irregular to the left side of the section and regularities increase to the right. In package IV, we observe a wedge of high singularity strength on the right part of the section which pinches out to the left. In a standard seismic section, the location for this point is extremely blurry and its boundaries are unclear, as illustrated as feature 50 in FIG. 7.

Figure 10:
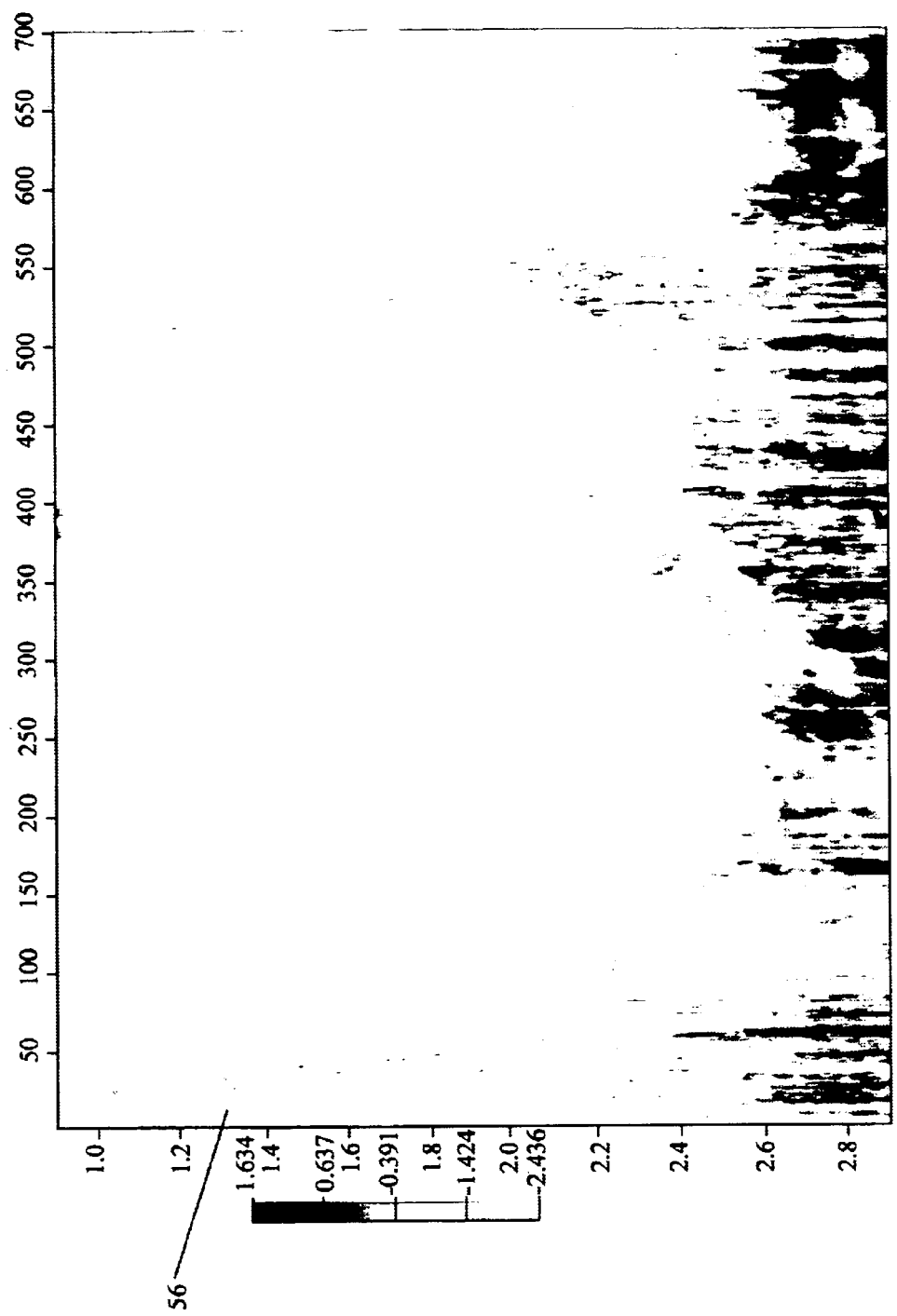
FIG. 10 shows another Hölder trace image.

FIG. 10 illustrates how use of different color bars allows different formations to be highlighted and studied. Depending on which particular region of the section is being analyzed, different color bars are used to analyze its boundaries and degree of regularity.

Figure 11A:
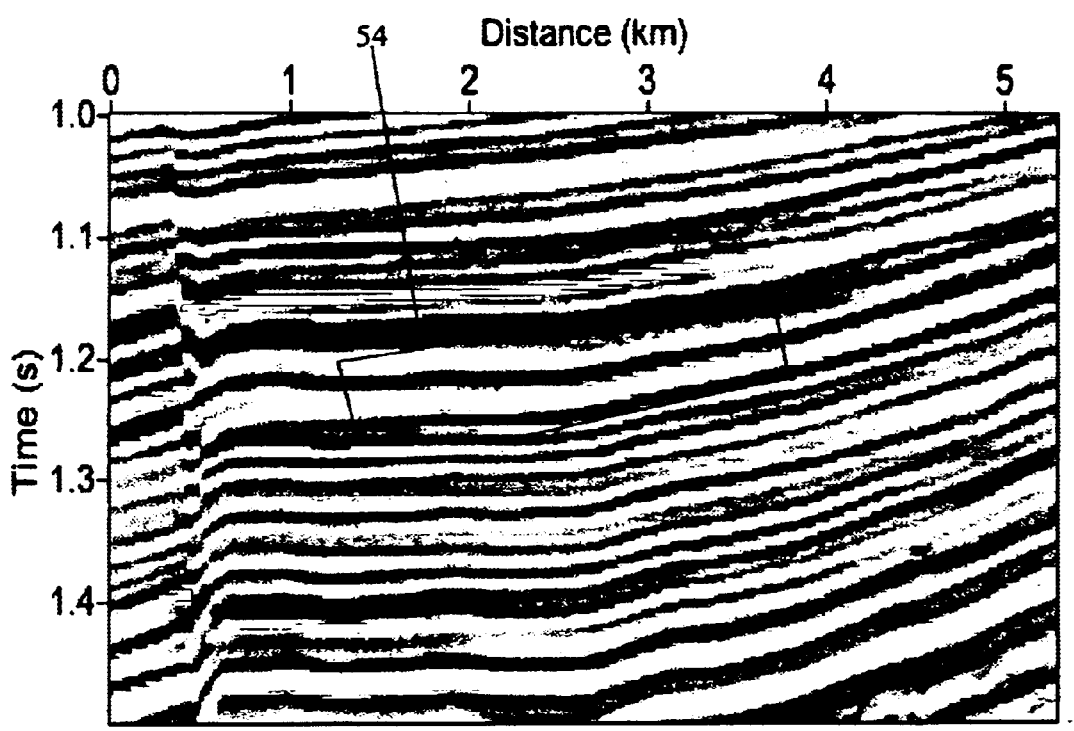
FIG. 11A shows a seismic image produced by seismic traces.
Figure 11B:
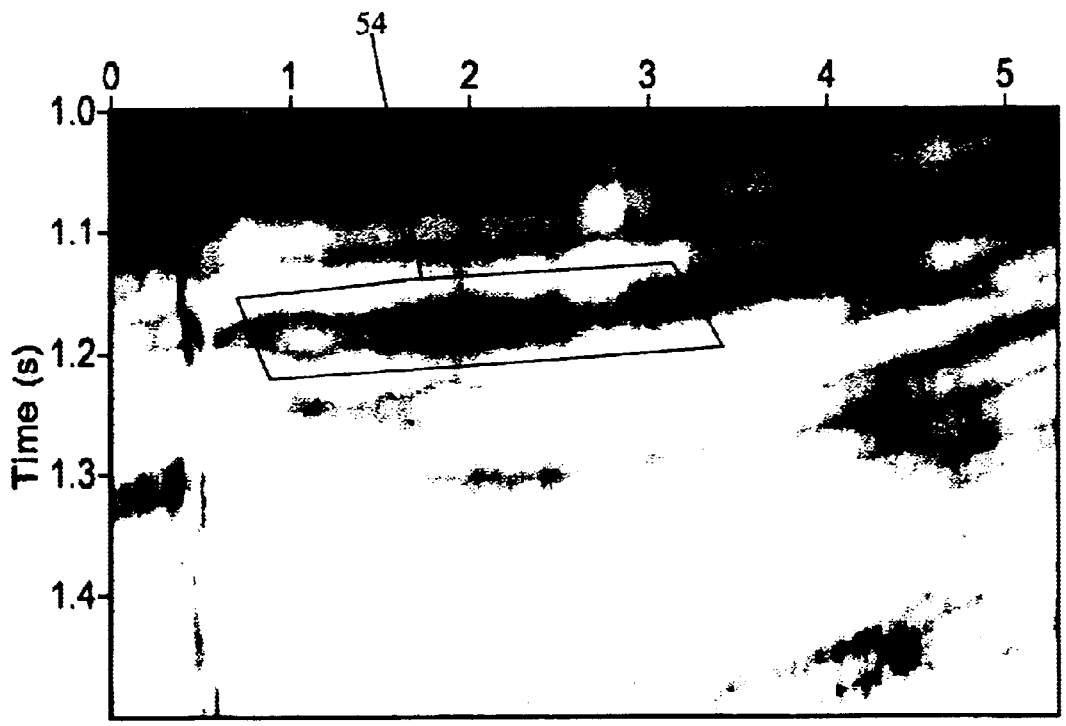
FIG. 11B shows a Hölder image produced by Hölder traces.

FIGS. 11A and 11B compare a small portion of a seismic trace section to a corresponding portion of a Hölder trace section. This comparison illustrates the marked difference between the two sections. Stratigraphic boundaries are much clearer on the Hölder trace section. For example, pinch-out region 54 is clearly seen in the Hölder trace section. It's boundaries are clear. In contrast, pinch-out region 54 in the seismic section is difficult to interpret. While an explorationist skilled in the art of analyzing seismic sections would identify pinch-out 54 from the seismic section, he or she would do so only with a modest amount of difficulty. Furthermore, the boundaries of the pinch-out region 54 cannot be distinctly and precisely determined from the seismic section. Those skilled in the art would appreciate that the Hölder trace section provides a significant advance in the art of exploration.

Figure 12:
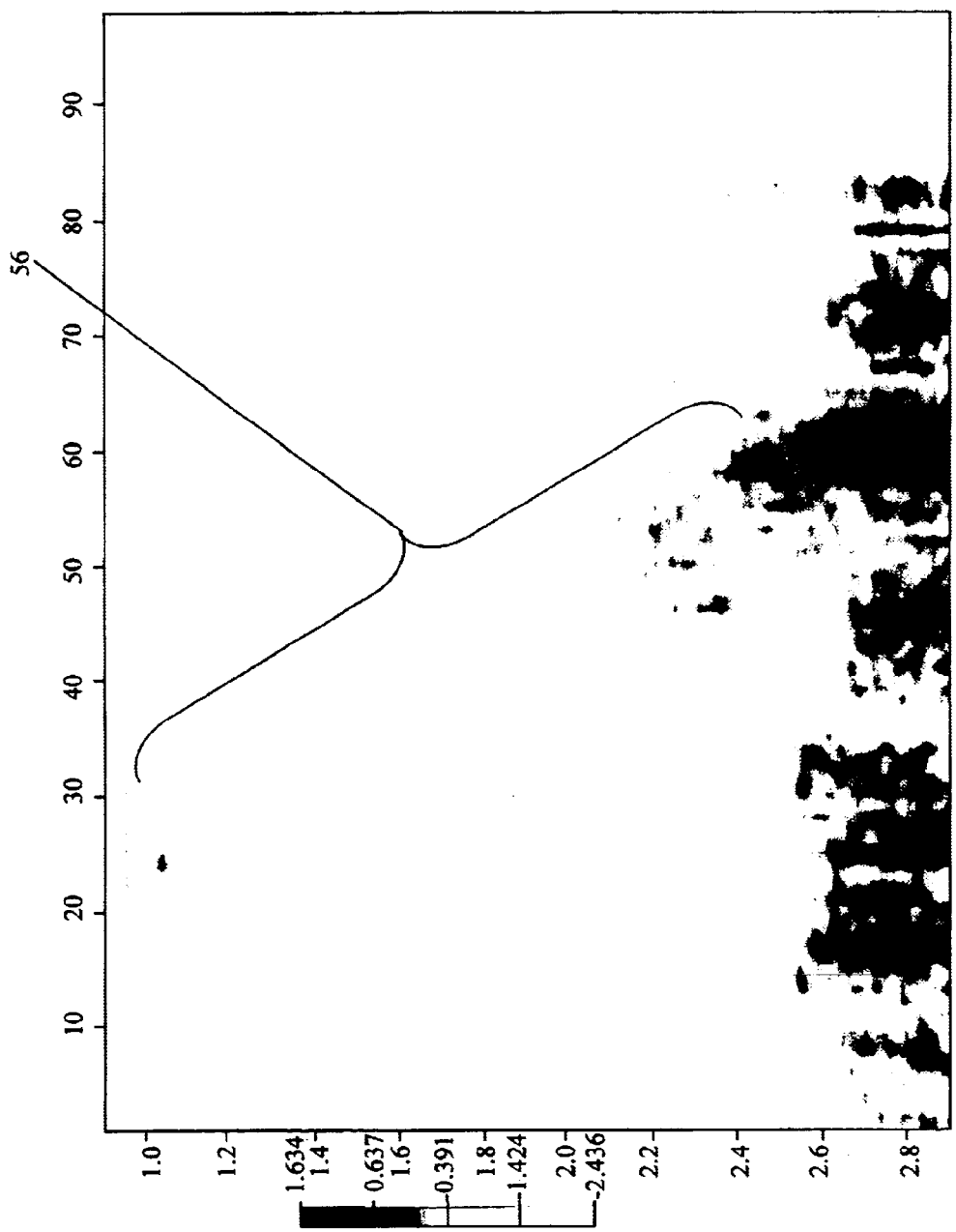
FIG. 12 shows a Hölder trace image of a fault line.

While the Hölder exponent is more tuned to detect stratigraphic boundaries, it also identifies fault lines exceptionally well because wavelet transforms provide for excellent edge detection. FIG. 12 is a Hölder trace section of the left most fault line 56 illustrated in FIGS. 7 through 10. As can be seen, the fault line is very clearly and distinctly marked across a broad range of stratigraphic packages. The placement of this fault shows up clearly.

This example illustrates use of Hölder exponent traces to create Hölder trace sections that correspond to typical seismic sections. For clarity, only a two dimensional section was illustrated. However, those skilled in the art will appreciate that this method may readily be applied to three and even four dimensional seismic data. Those skilled in the art will also appreciate that, due to the greatly enhanced clarity of stratigraphic boundaries produced by Hölder exponent traces, it is possible to design and develop software capable of automatically identifying specific stratigraphic features, such as wedges, down-cutting relationships and pinch-outs. This would further reduce the amount of time required for an explorationist to identify regions in the subsurface that are likely to harbor petroleum, natural gas, water or other materials.

EXAMPLE 2

We can reconstruct an approximate acoustic impedance profile based on Hölder attributes. This is very valuable in the field of seismic inversion. Data reconstruction is possible because the Hölder exponent traces reveal information about the direction and the relative magnitude of singularities in the acoustic impedance.

Calculation of reflection coefficients (RC) from acoustic impedance (AI) can be approximated as a first-order differentiation process. A 1st-order differentiation of a time series lowers the global scaling exponent (H) by one, and thus H older exponent ($\alpha$) decreases by one locally provided that the data is regular enough. Likewise, 1st-order integration on a signal will increase the Hölder exponent by one. This is applicable to all data points in the signal. It follows that $\alpha$ curve from RC is nearly a shifted version of $\alpha$ from AI. This is indeed the case for the present invention.

Figure 13:
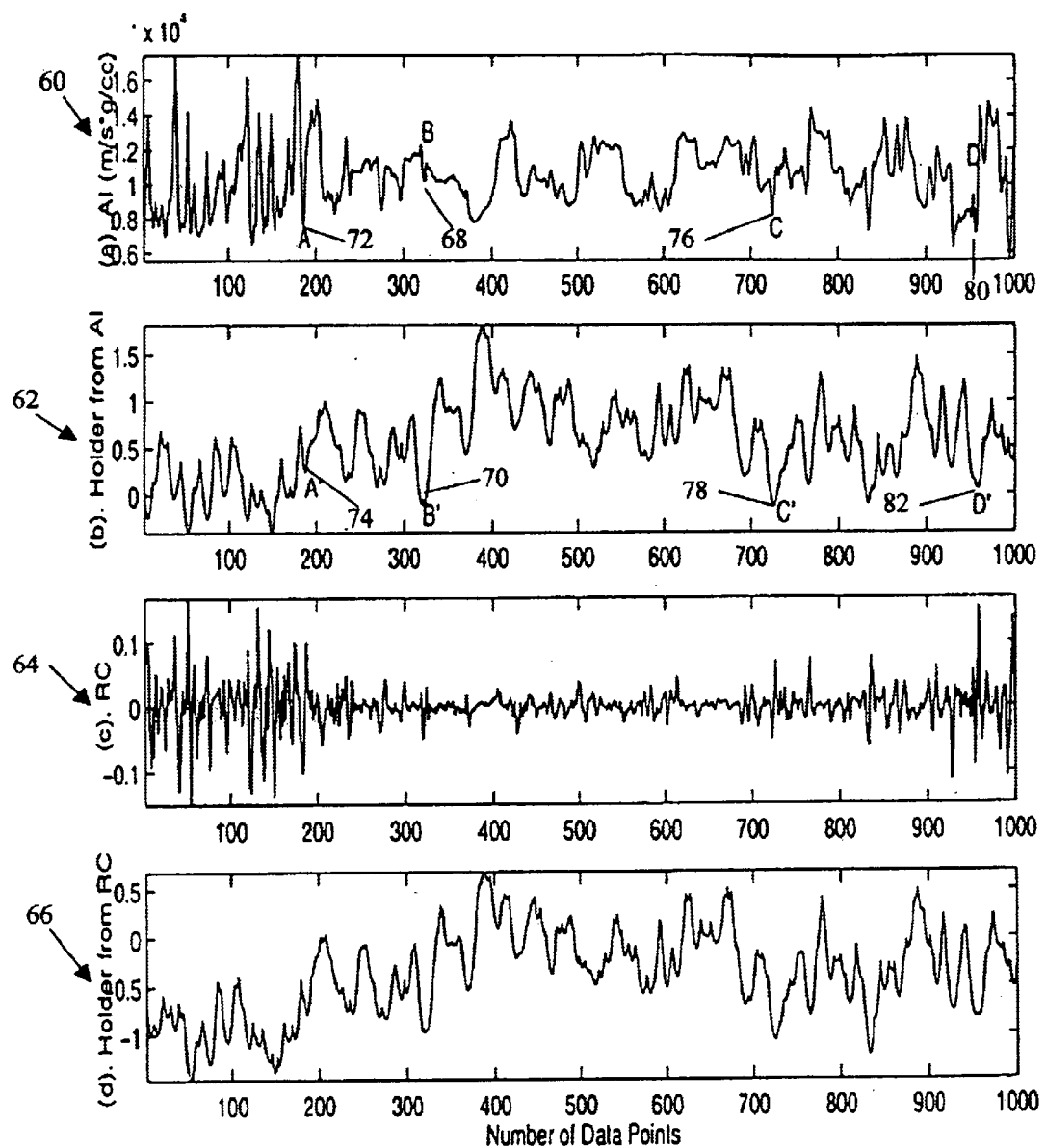
FIG. 13 shows acoustic impedance, reflection coefficients, and their Hölder exponents from a well in Southwest Kansas.
Figure 14:
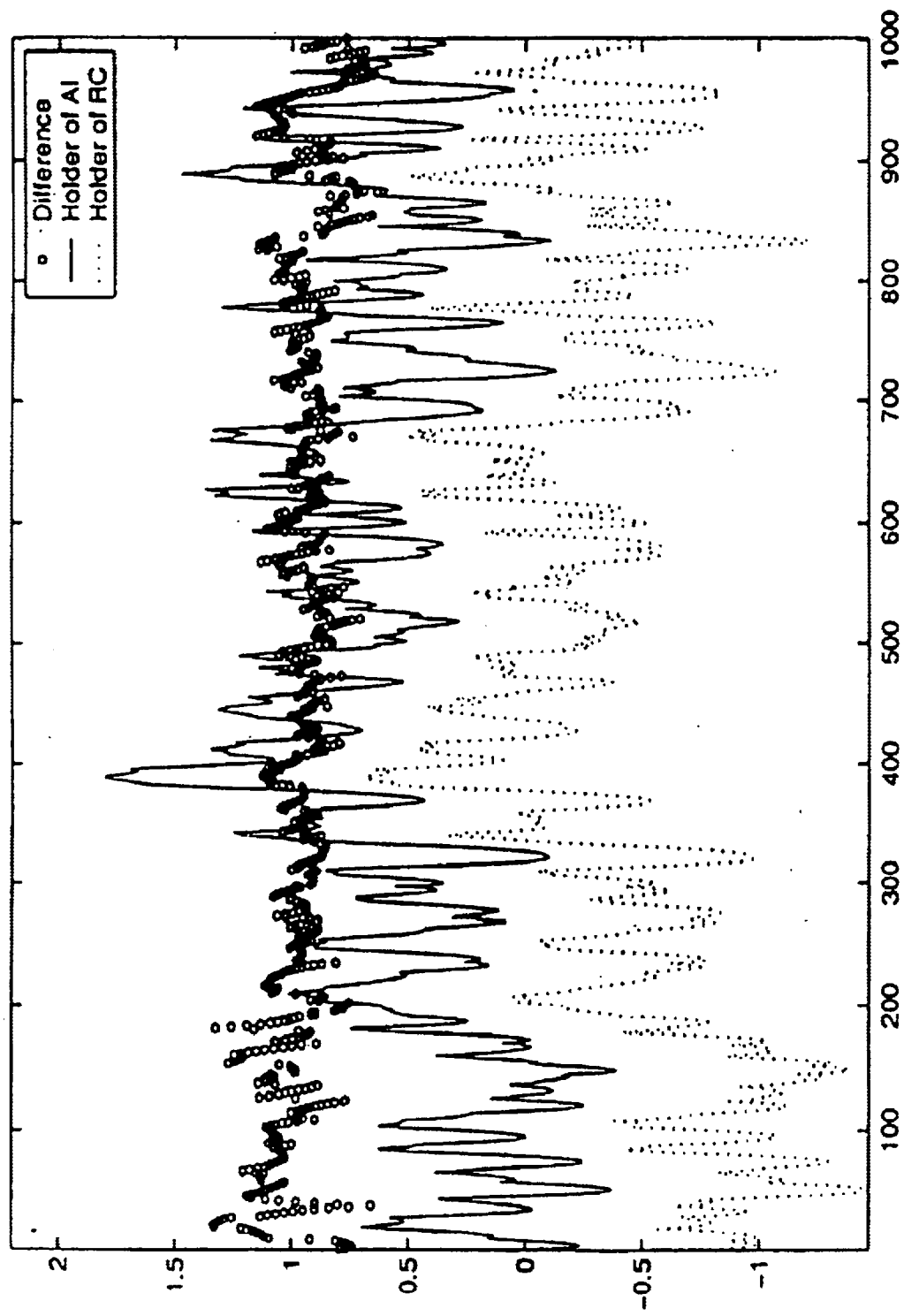
FIG. 14 shows a comparison between Hölder exponents from acoustic impedance and reflection coefficients.

FIG. 13 shows the acoustic impedance 60, the reflection coefficients 64, as well as their corresponding Hölder exponents 62 and 66 respectively. The sonic data are sampled at a constant interval of 0.5 ft (or ~0.15 m) from a well located in SW Kansas. FIG. 13 demonstrates that although acoustic impedance and reflectivity are significantly different in their appearances, their Hölder exponents are nearly identical. For this particular case the average difference between 62 and 66 is equal to 0.9565, which is almost equal to 1 (FIG. 14). The standard deviation in difference between 62 and 66 is only 0.1127.

Figure 15:
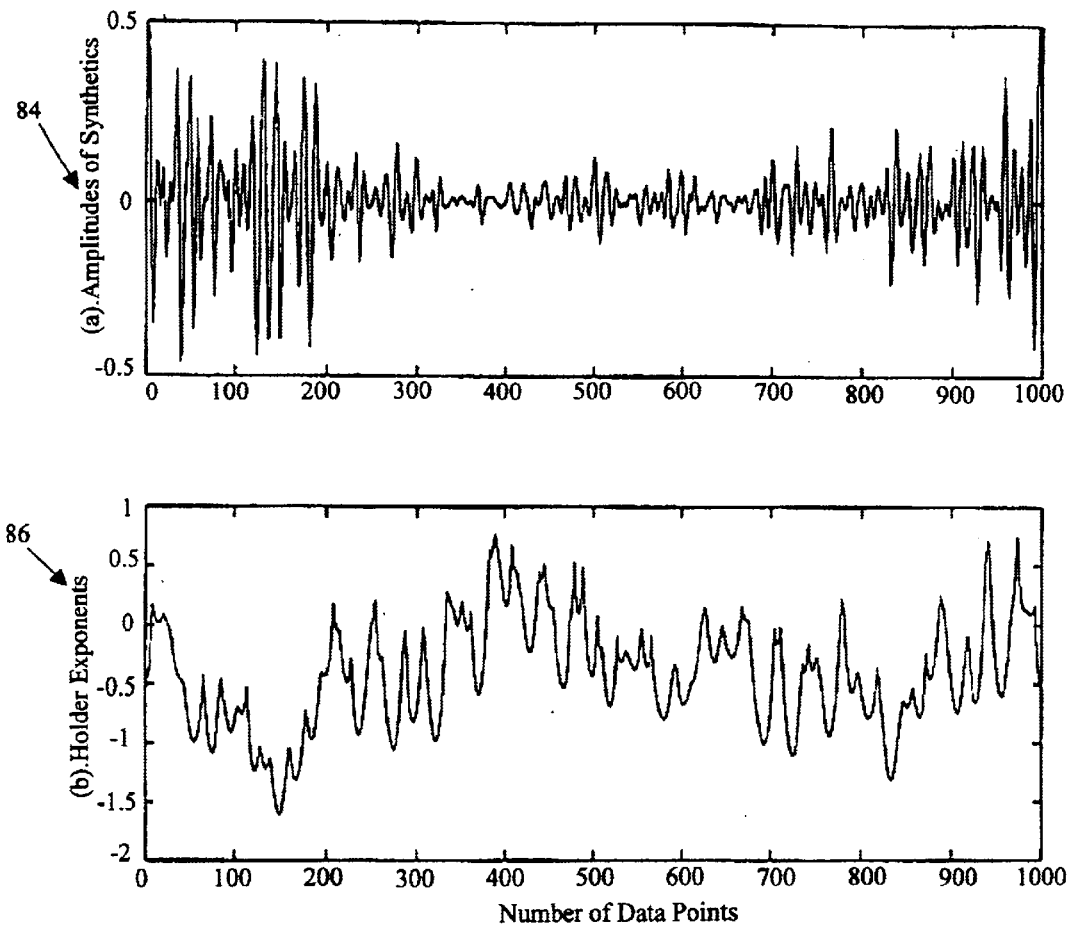
FIG. 15 shows a synthetic seismogram with a 40 Hertz Richer wavelet and its Hölder exponents.

Since the Hölder exponent is an indicator for the smoothness of the data, we can expect that convolution will increase the Hölder exponents. The amount of increase is dependent on the dominant frequencies of the input wavelet for convolution. It is useful here to consider the convolution as a fractional integration and $\Delta\alpha$ should be roughly equal to the fractional order of the integration. Convolving with a 40 Hz Ricker wavelet, however, does not dramatically increase the Hölder exponent in our experiment (FIG. 15). The Hölder trace 86 estimated from synthetics 84 is also nearly a shifted version of a from acoustic impedance. All major boundaries are captured.

The Hölder exponent ($\alpha$) passes with little change from acoustic impedance to reflectivity to synthetics created with a reasonable wavelet. That is, $\alpha$ curve from any one of the three is nearly a shifted version of another. This indicates that computing a from seismic trace yields important information about acoustic impedance. In this way $\alpha$ holds the potential to tell extra stratigraphic information and offers us a new perspective for interpreting seismic data.

Let us study again the $\alpha$ 62 shown in FIG. 13. First we see that the Hölder exponent starts at low average values from the left and then climbs up to higher values toward the middle section of the log, then $\alpha$ drops slightly again to the right. This pattern of $\alpha$ exactly captures the singularity characteristics existing in the log. The acoustic impedance is more irregular from point number 1 to 200, which gives lower $\alpha$. The middle section of the log is significantly different from the starting section. It appears to be more regular and has thick, blocky velocity layers. This higher degree of regularity gives higher $\alpha$. Then toward the end of the log, the velocities appear to be less regular again and we find corresponding locally low Hölder exponents for this part. Also major sharp bursts in the acoustic impedance are faithfully captured by low Hölder exponents. For example, points 68, 72, 76 and 80 on the acoustic impedance 60 correspond to Hölder exponents 62 at points 70, 74, 78 and 82 respectively. Since sharp changes in acoustic impedance could indicate fluid contacts, petrophysical property changes or lithologic boundaries, Hölder exponents capture important geologic information.

Hölder exponent detects mainly the singular behavior of geological boundaries. Because there is no relationship between the degree of singularity and the reflection coefficient of a geological boundary, it is generally considered that Hölder exponent is independent of seismic amplitude. High seismic amplitudes do not mean high degrees of singularities or very abrupt bursts. This distinguishes Hölder exponent from many other types of seismic attributes. True amplitude based methods, such as AVO, are very important for extracting subsurface lithologic information but the amplitude on a stacked seismic section could also disguise the true underlying geology. Deconvolved seismograms are regarded as the impulse responses of reflectivity. Because the reflection coefficients (RC) are computed from acoustic impedance (AI) contrasts based on $RC=(AI_2-AI_1)/(AI_1+A_2)$, a high contrast in AI, i.e. $AI_2-A_1$, may not induce a high reflection coefficient due to the normalizing factor $(AI_1+AI_2)$. Thus a big change in velocity and density is not always associated to high seismic amplitude. The nature of RC makes seismic amplitudes mainly oscillate around zero with more power on higher frequency oscillations at lower seismic amplitudes. For this reason seismic amplitudes can blur true stratigraphic boundaries and obscure true velocity and density variations.

Typically, reflection coefficients are reconstructed first based on well logging information and relative seismic amplitudes, then acoustic impedance is reconstructed from reflection coefficients. There is always a resolution problem when deducing acoustic impedance from seismic data. Efforts have been made to reconstruct pseudo seismic sections and wells based on singularity attributes from seismic and well data. In these cases all information are well qualified so the reconstruction is relatively easier. To reconstruct acoustic impedance profiles from seismic amplitude directly is more practically meaningful and important, and more difficult. In this example, we illustrate on possible approach.

The key to the reconstruction is to generalize the traditional zero or first order reflector models (step functions or ramp functions) to fractional order transitions. This generalization is natural because actual well log measurements often show that the outliers in the acoustic velocity can be parameterized by onset functions of the form $$T_+(z, \alpha) = \begin{cases} 0 & z \leq 0 \\ \frac{|z|^\alpha}{\Gamma(\alpha+1)} & z > 0 \end{cases} \text{ and } T_-(z, \alpha) = \begin{cases} -\frac{|z|^\alpha}{\Gamma(\alpha+1)} & z \leq 0 \\ 0 & z > 0 \end{cases},$$

where $\alpha$ is the Hölder exponent of the function, z is the depth, $\Gamma$ is the Gamma function and ± sign denotes weather the function is causal (+) or anti-causal (−). Step function and ramp function are just special types of onset functions, when $\alpha$ equals to 0 and 1 respectively.

With the help of generalized media velocity variations, we are able to reconstruct pseudo acoustic impedance based on singularity analysis of seismic data. The locations of the singular points are estimated along with their Hölder exponents, directivities, and the relative amplitudes. Then at each singular point an onset function with the same Hölder exponent as estimated on that point is assigned and adjusted according to the directivity and relative amplitudes. The rebuilding process is simply a geometrical chaining of these onset functions. Mathematically we can write $$AI(z) = \sum_{i=1}^{N} m_\pm^i T_\pm^i(z-z_i, \alpha_i),$$

where m is the relative magnitude.

There are two slightly different routes toward the AI reconstruction. The first route is to reconstruct the pseudo reflectivity (reflection coefficients) first and then build the pseudo AI recursively based on $$AI_{i+1} = \left(\frac{1+RC}{1-RC}\right) AI_i.$$

The relative amplitudes of the singularities are more accurately estimated from seismic amplitudes because:

1. Major singularities in reflectivity are captured in the seismic data, as we have seen earlier in this chapter;
2. Hölder exponents do not change considerably from reflectivity to seismograms, thus we can use Hölder exponents estimated from seismic data directly or without big changes in reflectivity reconstruction;
3. Reflectivity is more stationary that AI, so the reconstruction can be made more accurately.

The second route is to reconstruct AI directly with some corrections on Hölder exponents from seismic data. Seismograms can simply be considered as first order derivatives of AI but smoothed by a seismic wavelet. This defines a constant unitary shift in the Hölder exponents from AI to seismograms. After estimating Hölder exponents from seismic data, we then apply the correction to the Hölder exponents before direct AI reconstruction. One possible problem with this method is that it can result in large errors in the relative amplitude estimation because a big jump in AI may not always turn into a high seismic amplitude response. The main advantage of this method lies in that it is more physically meaningful to reconstruct AI directly from onset functions, which defines media transitions rather than reflectivity.

Whereas, the present invention has been described in relation to the drawings attached hereto, it should be understood that other and further modifications, apart from those shown or suggested herein, may be made within the spirit and scope of this invention.

What is claimed is:

1. A wavelet-based method for analysis of singularities in seismic data comprising:

acquiring at least one seismic trace;

applying a wavelet transform to said at least one seismic trace, said wavelet transform having a basis wavelet and producing wavelet coefficients for localized scales and localized time points; and calculating a Hölder exponent by regression for at least one of said localized time points.

2. The method of claim 1 wherein said basis wavelet is selected from the group consisting of a Harr wavelet, a Morlet wavelet, a Ricker wavelet or a Daubechies wavelet.

3. The method of claim 1 wherein said at least one seismic trace has undergone any stage of seismic data processing including raw field data to final migrated data.

4. The method of claim 2 wherein said basis wavelet is the morlet wavelet.

5. The method of claim 1 wherein said wavelet transform is selected from the group consisting of a continuous wavelet transform, a dyadic wavelet transform, a discreet wavelet transform or a fast wavelet transform.

6. The method of claim 1 wherein said calculating a Hölder exponent by regression for at least one localized time point comprises performing a least squares linear regression upon a log-log plot of said wavelet coefficients at said localized scales.

7. The method of claim 1 further comprising choosing an appropriate range of scales in order to improve the fit of the calculating a Hölder exponent by regression prior to performing said regression.

8. The method of claim 1 wherein said calculating a Hölder exponent for at least one localized time point comprises calculating Hölder exponents for a plurality of localized time points.

9. The method of claim 1 wherein said at least one seismic trace comprises a plurality of seismic traces.

10. The method of claim 9 wherein said Hölder exponents are utilized to form images of the subsurface.

11. The method of claim 8 further comprising forming a Hölder trace from the Hölder exponents for a plurality of localized time points.

12. A method for analysis of singularities in seismic trace data comprising:

performing a continuous wavelet transform on a seismic trace, said transform producing wavelet coefficients across a range of scales for each localized time point;

calculating the Hölder exponent across a range of scales for each localized time point of said transform by a regression means, thereby producing a Hölder trace; and applying image processing means to the Hölder trace, thereby producing a Hölder trace section.

13. The method of claim 12 wherein said seismic trace has undergone data processing comprising at least one of deconvolution, NMO/DMO, migration and stacking.

14. The method of claim 12 wherein said continuous wavelet transform comprises a basis wavelet and said basis wavelet is a Morlet wavelet.

15. The method of claim 12 wherein said regression means comprises a leased-squares linear regression of a log-log plot.

16. The method of claim 12 wherein the Hölder trace from seismic data is a substantially shifted version of a Hölder trace calculated from acoustic impedance data.

17. The method of claim 16 wherein the Hölder trace gives direct information about acoustic impedance variation.

* * * * *